(No Model.)
2 Sheets—Sheet 1.
B. A. WALRATH.
MECHANICAL MOVEMENT.
No. 601,294. Patented Mar. 29, 1898.
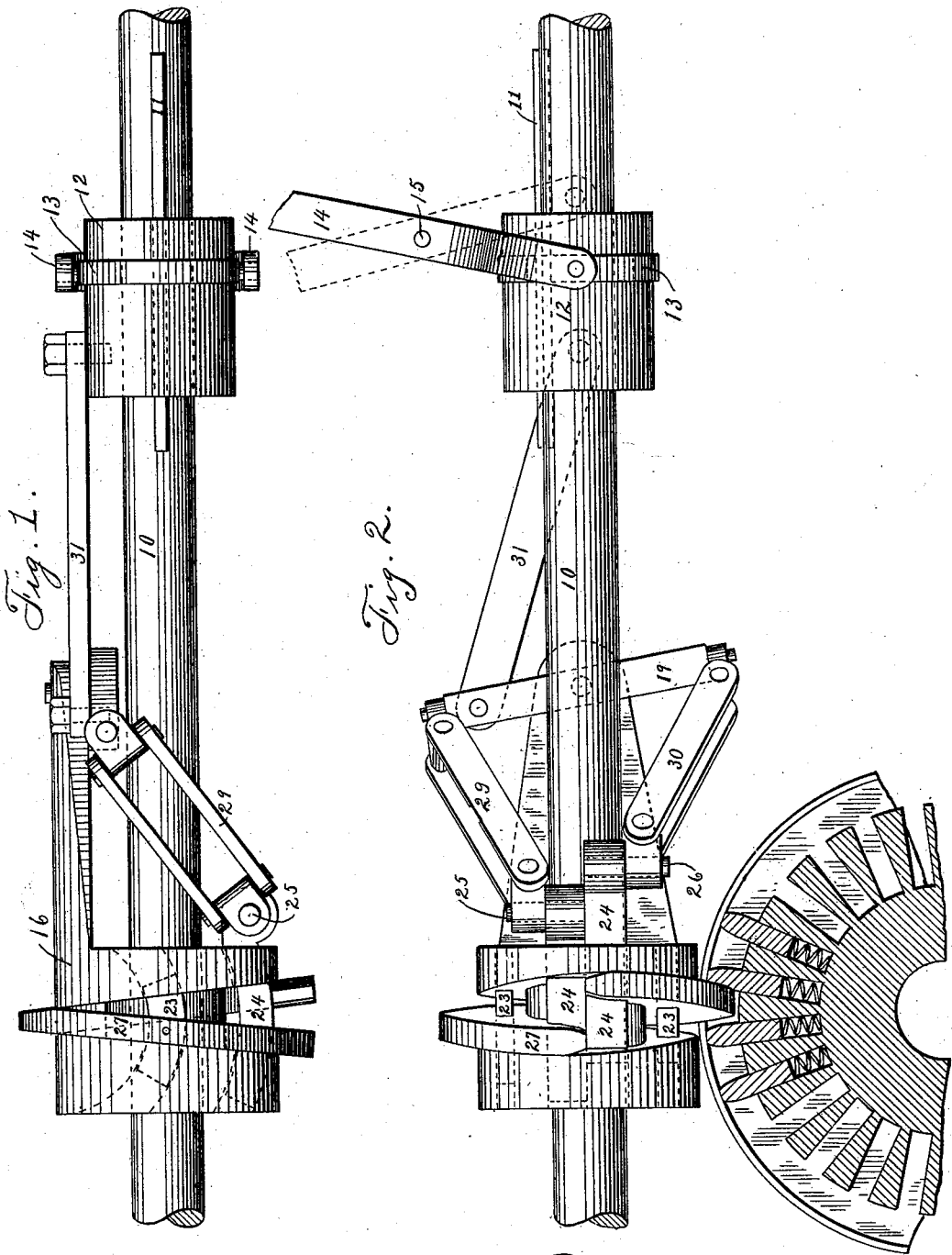

(No Model.) 2 Sheets—Sheet 2.
B. A. WALRATH.
MECHANICAL MOVEMENT.
No. 601,294. Patented Mar. 29, 1898.
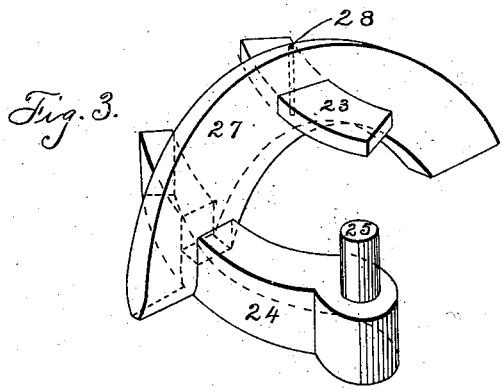
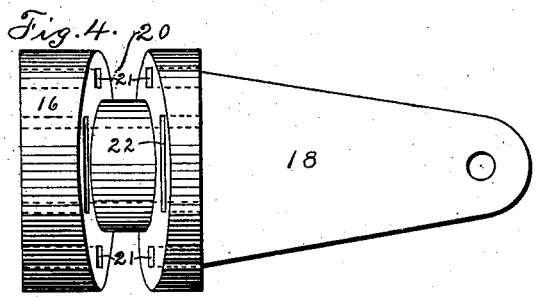
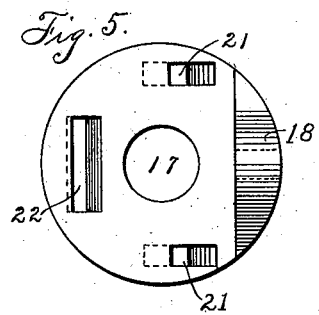
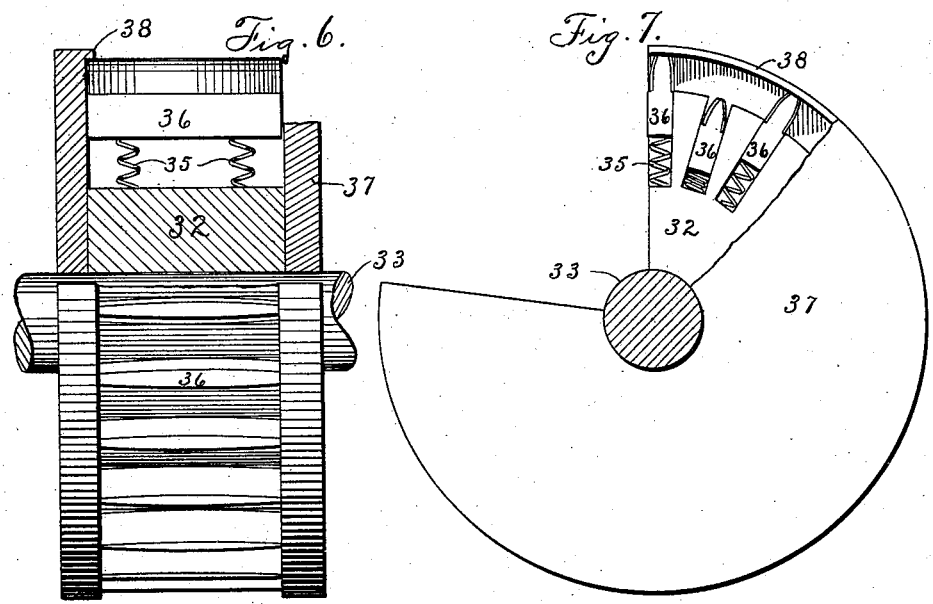
Witnesses:
J. A. Bramhall
R. G. Orwig
Inventor: Burton A. Walrath,
By Thomas G. and J. Ralph Orwig, Attys.

UNITED STATES PATENT OFFICE.

BURTON A. WALRATH, OF BLAIRSBURG, IOWA.

MECHANICAL MOVEMENT.

SPECIFICATION forming part of Letters Patent No. 601,294, dated March 29, 1898.

Application filed April 10, 1897. Serial No. 631,487. (No model.)

*To all whom it may concern:*

Be it known that I, BURTON A. WALRATH, a citizen of the United States, residing at Blairsburg, in the county of Hamilton and State of Iowa, have invented a new and useful Mechanical Movement for Steering Traction-Engines, &c., of which the following is a specification.

The object of this invention is to provide a new and useful mechanical movement designed to transmit motion from one shaft to another extending at an angle relative thereto, so arranged and constructed that the motion of one shaft may be reversed or held stationary while the other is continuously rotating in the same direction.

A further object is to provide simple, durable, and inexpensive mechanism for thus changing the direction of motion of a shaft.

My object is, further, to provide means of simple, inexpensive, and durable construction whereby when the movement of the driven shaft is being reversed, and in the event of the worm on one shaft not accurately meshing with the teeth of the gear on the other shaft, the said teeth will yield until the two gears reach a position where they will mesh.

My invention consists in certain details of construction, arrangement, and combination of parts whereby the new mechanical movement is obtained and the objects contemplated are attained, as hereinafter more fully set forth, pointed out in my claims, and illustrated in the accompanying drawings, in which—

Figure 1 shows a top or plan view of the driving-shaft and the mechanism attached thereto. Fig. 2 shows a side elevation of the driving-shaft and connected mechanism and also a sectional view of the gear to be attached to the driven shaft. Fig. 3 shows a detail perspective view to illustrate the construction of one section of the worm and connected parts. Fig. 4 shows a side elevation of the worm-bearer detached. Fig. 5 shows an end elevation of the same. Fig. 6 shows an end elevation, partly in section, of the gear on the driven shaft; and Fig. 7 shows a side elevation of the same with one of the gear-teeth in its depressed position.

Referring to the accompanying drawings, I have used the reference-numeral 10 to indicate the driving-shaft, which is provided with a feather 11. 12 indicates a collar mounted on the shaft upon said feather to be capable of a longitudinal sliding movement relative thereto. On this collar 12 is an annular ring 13, mounted in a groove therein, and 14 indicates a lever, fulcrumed at 15 to any suitable support and having its lower end pivotally connected with the ring 13, so that a movement of the said lever 14 will slide the collar 12 upon the shaft 10.

The reference-numeral 16 is used to indicate a part which is preferably cast complete in one piece and which I shall designate as the "worm-bearer." At one end it is approximately cylindrical in shape and provided with a central opening 17, through which the shaft 10 is passed, and capable of free rotation relative to the bearer.

18 indicates an arm formed integral with the cylindrical part of the bearer to project in a plane parallel with the shaft. This arm is provided for the purpose of supporting a lever 19, which is pivotally connected at its central portion with the outer end of the arm 18. At the central portion of the head of the worm-bearer I have formed an annular groove 20, having the sides thereof arranged on divergent planes, and each side of this annular groove is composed of a flat surface. Taking as a center the point between the sides of the groove 20 where the sides thereof are in greatest proximity, I have provided in the cylindrical head two concentric grooves 21, the one above and the other below the center, and also a concentric groove 22 in the side farthest from the center. In each of these grooves 21 I have placed a segmental slide 23, and in the groove 22 I have placed two segmental slides 24, the one having an upwardly-projecting journal 25 at one end and the other a downwardly-projecting journal 26 at the same end.

The reference-numeral 27 indicates a segmental plate for forming part of the worm-gear. This plate is of a somewhat greater diameter than the head of the worm-bearer and of a thickness at one end corresponding to the width of the annular groove 20 at its narrowest point. This segment is connected with one of the guides 23 by means of the pivot 28, and it is also connected with the slide 24 by being mortised therein. I also preferably incline the edge of the segment at one end, so that it may more readily enter the teeth of a cog-wheel. A similar segment is of course placed in the opposite half of the groove 20, and the ends of these segments are in the same plane and are capable of moving laterally relative to each other.

The reference-numeral 29 indicates a bridle connecting one end of the lever 19 with the journal 25, and 30 is a like bridle connecting the opposite end of the lever 19 with the journal 26.

31 indicates a link pivotally connected with the collar 12 and also with one end of the lever 19.

By means of the mechanism just described it is obvious that a movement of the lever 14 to its limit in one direction will separate the movable end of the segments 27, so that the two segments taken together will form a worm-gear having a certain pitch determined by the width of the groove 20 at its widest point, and when the said lever is thrown to its opposite limit the two segments will form a gear having the same pitch, but inclined in the opposite direction, and when the said lever is placed at its center of motion the two segments will form a disk, and hence not serve as a worm. It is obvious that this worm may be used for driving an ordinary cog-wheel in the usual manner and that when the lever is thrown to one limit of its movement the cog-wheel will rotate in one direction, and when at the other limit the cog-wheel will be turned in an opposite direction, and when at its center of motion the cog-wheel will remain inoperative. I have, however, found that in practical use and when it is desired to change the motion very rapidly the ends of the segments might strike directly upon the face of one of the teeth of the gear-wheel and either the teeth or the segment be broken. To prevent the possibility of such a contingency, I have provided a gear-wheel of the following construction:

The reference-numeral 32 indicates a hub arranged to be fixed to the driven shaft 33 and having in its periphery a series of radial slots 34. In each of these slots I have mounted two extensile coil-springs 35, and on top of each spring I have placed a tooth 36, arranged to slide freely in the slot. To limit the outward movement of these teeth 36, I have provided the plates 37 at the ends of the hub 32, having inwardly-projecting rims 38 designed to overlap the ends of the teeth 36, and thus limit their outward movement. In practical operation with this kind of a gear-wheel it is obvious that should the end of the segment or worm strike upon the face of the tooth the tooth will be depressed until the point on the worm is reached where the tooth will be permitted to spring upwardly. Otherwise the operation of this cog-wheel is exactly similar to the usual ones having fixed teeth.

Having thus described my invention, what I claim as new therein, and desire to secure by Letters Patent of the United States therefor, is—

1. A mechanical movement, comprising a shaft capable of rotation, a worm-bearer mounted thereon, two semicircular plates arranged with such relation to the worm-bearer and to each other as to completely encircle the worm-bearer, means for pivotally connecting the plates to the worm-bearer so that two adjacent ends of the plates are capable of movement in an arc whose radius is at right angles to the shaft and the remaining ends held stationary, means for limiting the movement of the said movable ends, and means for moving the said movable ends of the semicircular ends relative to each other, for the purposes stated.

2. A mechanical movement, comprising a shaft capable of rotation, a worm-bearer mounted therein, two semicircular plates hinged with such relation to the worm-bearer and to each other as to completely encircle the worm-bearer, means for pivotally connecting the plates to the worm-bearer so that two adjacent ends of the plates are capable of a movement in an arc whose radius is at right angles to the shaft and the remaining ends held stationary, means for moving the movable ends of the semicircular plates relative to each other, means for limiting such movement, and a cog-wheel arranged in position to mesh with the worm or thread formed by the said semicircular plates when their movable ends are separated, for the purposes stated.

3. A mechanical movement, comprising a shaft capable of rotation, a worm-bearer mounted thereon and having an annular groove therein with divergent sides, two semicircular plates in said groove and arranged with such relation to each other and to the worm-bearer as to completely encircle the worm-bearer, means for pivoting the said segmental plates within the groove so that two adjacent ends of the semicircular plates may be moved relative to each other in an arc whose radius is at right angles to the shaft without disturbing the relative positions of the other ends of the semicircular plates, a lever pivoted to the worm-bearer, means for connecting each end of said lever with one of the movable ends of the said semicircular plates, and a cog-wheel rotatably mounted in position to mesh with the worm formed by the said semicircular plates when their movable ends are separated, substantially as and for the purposes stated.

4. A mechanical movement, comprising in combination, a shaft capable of rotation, a collar feathered thereto, a ring rotatably mounted in an annular groove in said collar, a lever pivoted to said ring, a worm-bearer rotatably mounted on the said shaft, and having an annular groove having divergent sides, two or more slides mounted in the said worm-bearer, two segments pivotally mounted in the said groove and connected with said slides, an extension formed on or fixed to the said worm-bearer, a lever pivoted to said extension, bridles pivoted to the ends of said levers and to the said slides, a link connecting one end of said lever with the said sliding collar, and a cog-wheel arranged to mesh with the worm formed by the said segments, all arranged and combined substantially in the manner set forth, and for the purposes stated.

5. A mechanical movement, comprising in combination, a shaft capable of rotation, a collar feathered thereto, a ring rotatably mounted in an annular groove in said collar, a lever pivoted to said ring, a worm-bearer rotatably mounted on the said shaft, and having an annular groove having divergent sides, two or more slides mounted in the said worm-bearer, two segments pivotally mounted in the said groove and connected with said slides, an extension formed on or fixed to the said worm-bearer, a lever pivoted to said extension, bridles pivoted to the ends of said levers and to the said slides, a link connecting one end of said lever with the said sliding collar, a gear-wheel comprising a hub having a series of radial slots, extensile springs in said slots, teeth slidingly mounted in said slots on top of said springs, and end plates for the hub, having inwardly-projecting flanges to limit the outward movement of the teeth, substantially as and for the purposes stated.

BURTON A. WALRATH.

Witnesses:
J. C. McNEE,
G. A. WALRATH.